Dec. 29, 1931.  A. W. FREHSE  1,838,382
BRAKE MECHANISM
Filed Dec. 26, 1929
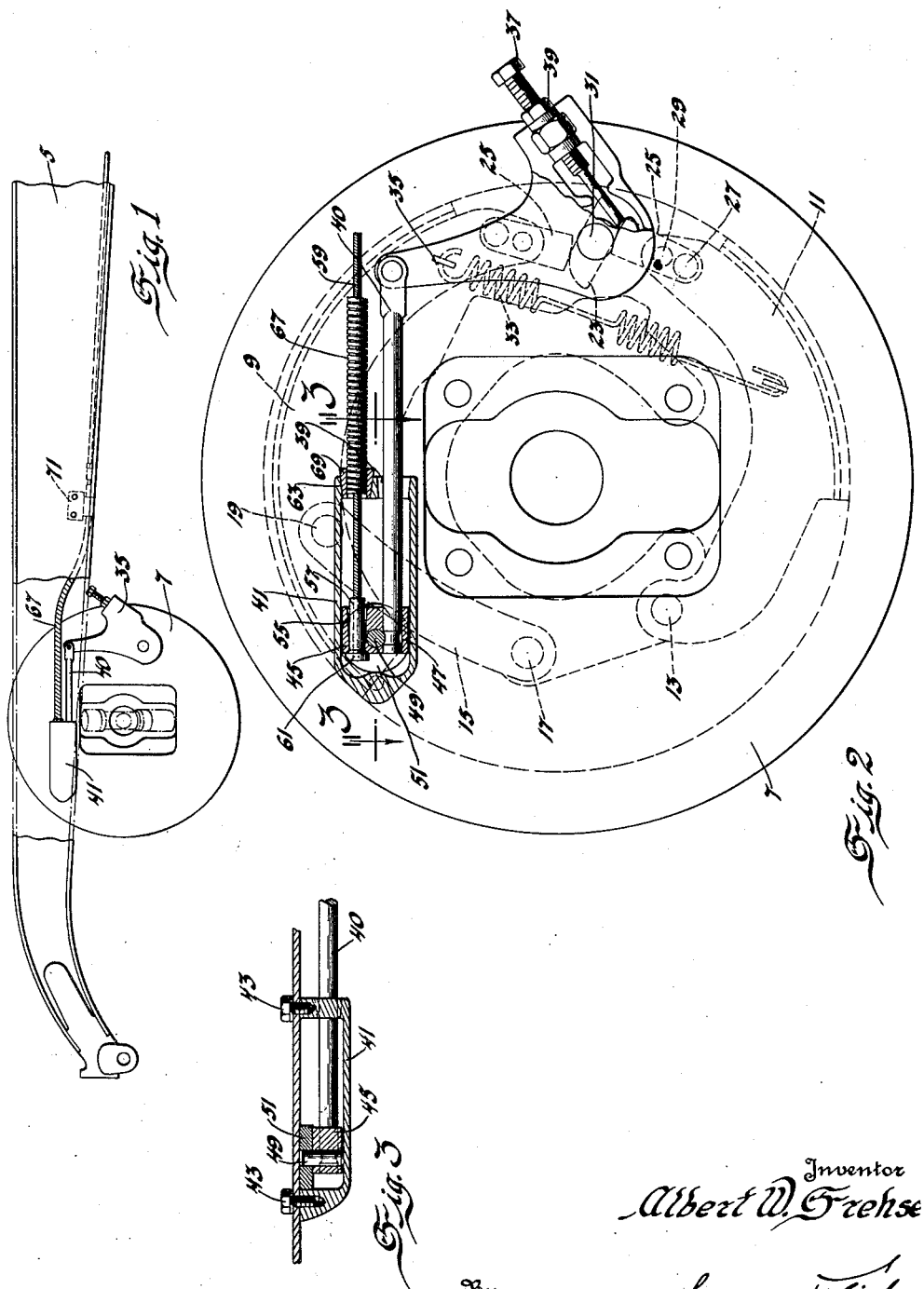
Inventor
Albert W. Frehse
By Blackmore, Spencer & Finch
Attorneys Patented Dec. 29, 1931

1,838,382

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

BRAKE MECHANISM

Application filed December 26, 1929. Serial No. 416,424.

This invention relates to brakes and more particularly to the operating mechanism for effecting a frictional engagement of the relatively moving parts. While useful elsewhere, the invention has been designed more especially for the brakes on front wheels of vehicles. In the case of the front wheel brakes, where the wheel turns on a stub axle for steering, it is necessary to provide a jointed operating mechanism or a flexible operating cable. My invention relates to the last-named type of operating mechanism and involves novel structure having certain useful objects.

Among the objects of the invention are—

First—to simplify the connection between the flexible cable and the lever arm on the operating shaft.

Second—to provide a reverse motion connection whereby a cable operating under tension operates upon a rod actuating the cam shaft arm through compression.

Third—to provide for housing the operating mechanism to avoid trouble arising from the entrance of foreign matter to the housing of the flexible cable.

Other objects and advantages will be understood from the following description.

In the drawings—

Figure 1 is a view in side elevation of a part of the front end of a vehicle chassis.

Figure 2 is a view in side elevation, partly in section.

Figure 3 is a sectional view on line 3—3 of Figure 2.

In the drawings, numeral 5 represents the chassis frame bar of a vehicle and 7 the fixed or backing plate to be associated with the usual brake drum on the wheel. This backing plate, as is customary, supports the shoes, which are to be brought into frictional engagement with the drum. While the brake mechanism is not of itself a part of this invention, there is illustrated a shoe 9 which is self-actuating for forward wheel rotation and a shoe 11, shorter in length, which is self-actuating for checking the reverse rotation of the wheel. The shoe 11 is pivoted to the backing plate 7 by a pin 13. At 15 is an articulating link pivoted at 17 to the backing plate and at 19 to the shoe 9, intermediate its ends. Between the adjacent ends of the shoes is a cam 23. This cam engages sectional rollers, or the like, 25, pivoted to the shoes as at 27, and having limited movement relative to the shoe ends as at 29. The cam shaft 31 may be, and preferably is, mounted by suitable means whereby it has a floating and centralized position between the shoes, this mounting not constituting a part of this invention. Retracting spring 33 serves to hold the shoes upon the cam when the brake applying force is released. No invention is herein claimed for the brake involving the two shoes and the actuating means thus far described.

The cam shaft is provided with an arm 35, which is adjustably related to the shaft 31 by adjusting means 37 and a lock nut 39. No invention is herein claimed for this adjusting arm.

At the end of the arm 35, there is pivoted thereto a rod 40. This rod extends through an opening 39 in the end of an elongated housing 41 secured as by fastening means 43 to the backing plate 7, its open end being substantially in the king pin axis. A cross-head 45 is mounted to reciprocate within the housing 41, and the rod 40 extends into and through an opening 47 in the cross-head and is secured thereto for a slight oscillating movement by a pin 49 as shown in the drawings. On pin 49, outside the cross-head, is a roller 51 which serves to provide anti-friction movement for the cross-head as it reciprocates in the housing. Above the pin 49, the cross-head has an opening 55 parallel to opening 47, through which opening passes the tip 57 of a flexible cable 59. The enlarged end 61 of the tip retains the cable from axial movement through the opening when under tension. The cable extends out through a second opening 63 in the end of the housing, and to the chassis frame where it is to be connected to any suitable brake operating device. Surrounding the flexible cable is a flexible housing 67. The end of this housing adjacent the wheel is secured within a tapered member 69 which is secured into the opening 63 and held in place by the thrust of the conduit or housing. The other end of the housing 67 is secured in any convenient way to the chassis frame, as by a clip 71. The housing is to be filled with heavy grease.

By the arrangements described above, it will be seen that owing to the flexibility of the operating cable, the wheel is free to turn for the purpose of steering. The tension on the flexible cable operates to reciprocate the cross-head and to rotate the lever arm 35 through the compression rod 40. Since the housing 41 is secured to the backing plate and since the cable housing 67 is snugly fitted into the opening 63, there is no danger of foreign matter entering the housing 67 around the cable 59. The disadvantageous component of the force operating through the flexible cable is taken care of by the reciprocating cross-head and the rod 40 connected to the cross-head operates the cam shaft arm 35 about its pivot 31.

I claim:

1. In a brake, a fixed plate including an external housing, brake operating means including a lever arm positioned adjacent said plate, a compression rod reciprocable in said housing extending therefrom and attached to said lever arm, and means to reciprocate said rod together with a cross-head reciprocable in said housing and attached to said rod, and said last named means including a flexible cable attached to said cross-head and extending outwardly therefrom.

2. In a brake, a fixed plate including an external housing, brake operating means including a lever arm positioned adjacent said plate, a compression rod reciprocable in said housing extending therefrom and attached to said lever arm, and means to reciprocate said rod together with a cross-head attached to said rod within said housing, said last-named means including a flexible cable attached to said cross-head and extending outwardly therefrom, and means to guide said cross-head in said housing.

3. In a brake, a backing plate, a housing secured thereto, a cam shaft arm adjacent said backing plate, a cross-head reciprocable in said housing, a compression element attached to said cross-head and to said arm and a tension cable attached to said cross-head and extending in a direction parallel to said cross-head within said housing.

4. In a brake, a fixed plate including an external housing, brake operating means including a lever arm positioned adjacent said plate, a compression rod reciprocable in said housing extending therefrom and attached to said lever arm, and a tension member operably connected to said compression rod within said housing and extending from said housing to a position for remote actuation.

5. The invention defined by claim 3 together with anti-friction means carried by said cross-head and engaging said housing.

6. In a brake for vehicles having a frame and a steering wheel, a plate fixed from rotation with said wheel but movable therewith in steering, a brake lever adjacent said plate, a housing secured to said plate, a compression rod reciprocable in said housing and externally attached to said lever, a substantially parallel tension member operably connected to said compression member within said housing and extending from said housing for remote actuation.

7. The invention defined by claim 6, said operable connection between the compression members and tension member including a reciprocable cross-head.

8. The invention defined by claim 6, said operable connection between the compression and tension members including a reciprocable cross-head and means to provide anti-friction engagement between the cross-head and housing.

9. The invention defined by claim 6 together with a flexible casing surrounding said tension member outside said housing and secured to said housing and said frame.

In testimony whereof I affix my signature.

ALBERT W. FREHSE.